United States Patent [19]

Hnat

[11] Patent Number: 4,553,997
[45] Date of Patent: Nov. 19, 1985

[54] PROCESS FOR MELTING GLASS IN A TOROIDAL VORTEX REACTOR

[76] Inventor: James G. Hnat, 3774 Lewis Rd., Collegeville, Pa. 19426

[21] Appl. No.: 585,978

[22] Filed: Mar. 5, 1984

[51] Int. Cl.⁴ ............................................. C03B 5/14
[52] U.S. Cl. ........................................ 65/27; 65/135; 65/136; 65/335; 65/347
[58] Field of Search .................. 65/27, 134, 135, 335, 65/347, 136

[56] References Cited

U.S. PATENT DOCUMENTS

| | | | |
|---|---|---|---|
| 2,006,947 | 7/1935 | Ferguson | 49/53 |
| 2,634,555 | 4/1953 | Henry et al. | 49/77 |
| 3,077,094 | 2/1963 | Jack et al. | 65/136 |
| 3,172,648 | 3/1965 | Brichard | 263/31 |
| 3,185,554 | 5/1965 | Swed et al. | 65/17 |
| 3,244,494 | 4/1966 | Apple et al. | 65/136 |
| 3,510,289 | 5/1970 | Boivent | 65/346 X |
| 4,185,984 | 1/1980 | Kiyonaga | 65/135 |
| 4,381,934 | 5/1983 | Kunkle et al. | 65/135 |

FOREIGN PATENT DOCUMENTS

| | | | |
|---|---|---|---|
| 476596 | 5/1975 | Australia | 65/134 |
| 4017 | of 1875 | United Kingdom | 65/335 |
| 0708129 | 1/1980 | U.S.S.R. | 65/346 |

*Primary Examiner*—Robert Lindsay
*Attorney, Agent, or Firm*—Steele, Gould & Fried

[57] ABSTRACT

A method of melting glass in a toroidal vortex reactor wherein first pulverized glass batch materials are entrained in an oxidant flow which creates a first gas-solids suspension. This first gas-solids suspension is heated in combusting fuel to form a heated suspension which is thereafter mixed with second glass forming ingredients, whereby a second gas-solids suspension is formed. The second gas-solids suspension is injected into the toroidal vortex reactor from a plurality of locations about the circumference thereof. The heated suspension particles in the reactor collide with each other and the wall of the reactor and form a glass layer which flows down the reactor wall and is withdrawn at the bottom thereof.

23 Claims, 5 Drawing Figures

PROCESS FOR MELTING GLASS IN A TOROIDAL VORTEX REACTOR

BACKGROUND OF THE INVENTION

This invention relates to the field of glass melting and in particular relates to the melting of pulverized glass batch concurrent with the combustion of gas or oil in a high temperature toroidal vortex melting system.

In current gas or oil fired glass melting operations, the glass product is formed from the melting of mineral matter (glass batch) in an open-hearth type furnace. Many design changes have been incorporated into these furnaces since the original patents obtained by the Siemens family in the late 1800's. However, the fundamental heat transfer mechanisms for melting the glass batch are still quite similar to those in the original furnaces. Because open-hearth furnaces primarily rely on radiation from the flame and crown for heat transfer to the batch being melted, the surface area of the melter is necessarily large. This large surface area, even with substantial insulation, leads to wall heat transfer losses which are in the order of 20 percent of the thermal input to the melter. These high wall heat transfer losses coupled with the heat losses associated with the stack gas and glass product sensible heat are the major factors contributing to the low operating efficiency of current furnace designs. Typical heat rates for current furnace designs range from 5.0 million Btu to 7.0 million Btu per ton of glass produced. The heat rate for the toroidal toroidal vortex melting system using conventional heat recovery technology is projected to be in the range of 2.9 million to 4.0 million Btu/ton without electric boosting. Projections are that heat rates as low as 2.5 million Btu/ton are possible if advanced heat recovery technology is utilized.

Numerous attempts have been made to improve furnace efficiency over the past 50 years. Descriptions of innovative glass melting concepts for which development has been attempted have been compiled by A.G. Pincus (*Melting In the Glass Industry*—6 volumes, Books for Industry, N.Y. 1976). Of particular note is the furnace invention by Alexander Ferguson in 1923 which is reported to have melted 60 mesh glass batch in suspension in a refactory lined cyclone type furnace.

In addition, a number of plasma arc furnaces have also been developed which incorporate suspension melting. Several of these furnace designs are described in the "Journal of Minerals Science Engineering", Volume 9, No. 3, July, 1977. Plasma arc furnaces rely heavily on the use of electric power for the melting process, and although different in principle from the gas or oil fired toroidal vortex melter, do demonstrate the ability to melt glass and ceramic type products in suspension.

SUMMARY OF THE INVENTION

The primary purpose of this invention is to melt glass and glass-like products in a thermally efficient manner in a high temperature gas or oil fired toroidal vortex melting system. The process invention assumes the toroidal vortex melter incorporates the essential features of slagging coal combustors such as the AVCO toroidal vortex combustor developed by the U.S. Department of Energy for magnetohydrodynamic (MHD) power generation applications.

A second objective of the invention is to reduce the NOx and SOx flue gas emissions relative to those emissions typical for current gas or oil fired open-hearth type glass furnaces.

A third objective is to provide operational flexibility in terms of improved startup and shutdown and product change-over capability.

A fourth objective is to reduce the furnace capital cost through the elimination or at least minimization of melter refractories.

The vortex glass melting process relates to the melting of pulverized glass batch concurrent with the combustion of gas or oil in a high temperature toroidal vortex melting system. One type of toroidal vortex melting reactor capable of being utilized in the process is a technical derivative of a slagging combustor developed by the AVOC Everett Research Laboratory for the U.S. Department of Energy for MHD power generation applications. A primary distinction between the use of the toroidal vortex chamber for glass melting applications versus its use for MHD power generation relates to the embodiment of the device as a method of conserving gas and oil through the reduction of heat losses for glass melting as opposed to the combustion of coal for the production of a high temperature MHD plasma.

The present process incorporates efficient heat transfer to pulverized glass ingredients and low wall heat losses in a MHD type toroidal vortex reactor while providing additional process capabilities which cannot be achieved in current commercial glass melting sytems. Specifically, the use of the toroidal vortex melter provides for the potential control of NOx formation via substoichiometric combustion and combustion product time-temperature control; it eliminates the use of expensive refractory bricks in the glass melting zone; and it allows for rapid startup/shutdown and product change-over by reduced use of refractories and glass inventory within the melter. The production of reduced flint glass without the use of salt cake also appears feasible.

In one embodiment of the process of the present invention, glass forming materials are melted in a toroidal vortex reactor. First glass batch material or materials are entrained in a (preferably preheated) oxidant flow to form a gas-solids suspension. This entrained gas-solids suspension is then passed through a combustion chamber where fuel, such as oil or gas, is burned, thereby raising the temperature of the gas-solids suspension. Thereafter, a second glass forming material or a mixture thereof is fed into the heated stream and a second gas-solids flow is created. This second gas-solids flow is injected into the toroidal vortex reactor from several locations around the circumference thereof so that the injected flows meet at a common point within the reactor. The solids collide with and impinge each other at the focal point and along the flow streams within the reactor and along the reactor walls to form a liquid glass on the reactor walls which flows downward to a reservoir at the bottom of the reactor.

BRIEF DESCRIPTION OF THE DRAWINGS

The above and additional objectives of the present invention will become more apparent from the following detailed description taken in conjunction with the formal drawings, wherein.

DESCRIPTION OF THE PREFERRED EMBODIMENT

The theory behind the method of this invention generally relates to preheating pulverized glass making materials in suspension and dispersing the materials onto a preferably water-cooled reactor vessel wall by the fluid mechanical centrifugal separation forces of a toroidal vortex where glass forming reactions occur. Homogenization and refining occur as the formed glass moves down the wall of the reaction vessel in a thin layer under the influence of gravity and gas dynamic shear forces.

The process invention sequentially and/or segmentally preheats three classes of glass batch ingredients. Class I batch ingredients are defined as glassmaking materials which do not decompose readily upon heating, and the oxides of the materials have relatively low vapor pressures (i.e., less than about 0.1% of the species in the vapor phase) at temperatures typical for glassmaking operations; i.e., 2100° F.–3000° F. Examples of Class I batch ingredients are sand, cullet, syenite, and burned lime. Class II batch ingredients are defined as glassmaking materials which decompose or give off gas upon heating, but the oxides of these materials have relatively low vapor pressures at glass melting temperatures. Examples of Class II batch materials are limestone ($CaCO_3$) and dolomite ($CaO \cdot MgO \cdot 2CO_2$). For these Class II ingredients, $CO_2$ is driven off upon heating to temperatures above about 1800° F. The remaining oxides, CaO and MgO, however have low vapor pressure and remain stable at temperatures to well above 4000° F. Class III batch materials are ingredients which decompose readily upon heating, and the remaining oxides have relatively high vapor pressures (i.e., greater than about 1% of the species in the vapor phase) at glass melting temperatures. Examples of Class III glass batch ingredients are soda ash ($Na_2CO_3$) and potassium carbonate ($K_2CO_3$). For these materials, temperature elevation drives off the $CO_2$ and can also substantially vaporize the remaining alkali oxide. Considerations of nozzle or injector plugging due to the relatively low melting points of Class III ingredients also limits the extent of preheating of these materials prior to introduction into the toroidal vortex reactor. In this regard, the melting point of $Na_2CO_3$ is 1562° F. and $K_2CO_3$ is 1635° F.

The process invention can utilize gaseous or liquid fuels. The gaseous fuels typically include natural gas, coal derived gases, reformed gases and/or other common gaseous fuels such as propane, butane, etc. The liquid fuels include residual fuel oils, distillate fuel oils, coal derived liquid fuels, methanol, ethanol and/or other hydrocarbon liquid fuels.

Figure 1:
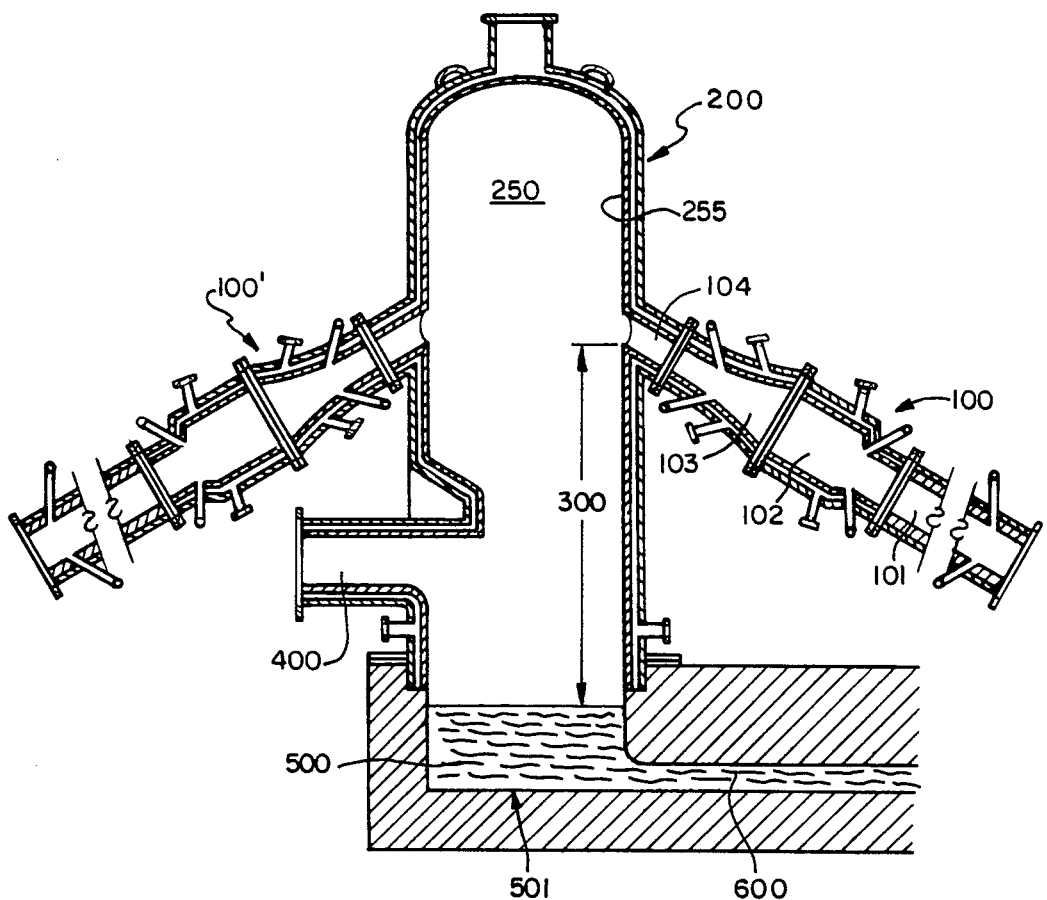
FIG. 1 is a cross sectional view of the vortex glass melting system showing the batch preheater/injector assemblies, the toroidal vortex melting chamber, the refining/homogenization section, the final refining chamber, the product glass distribution duct and the flue gas distribution duct.
Figure 2:
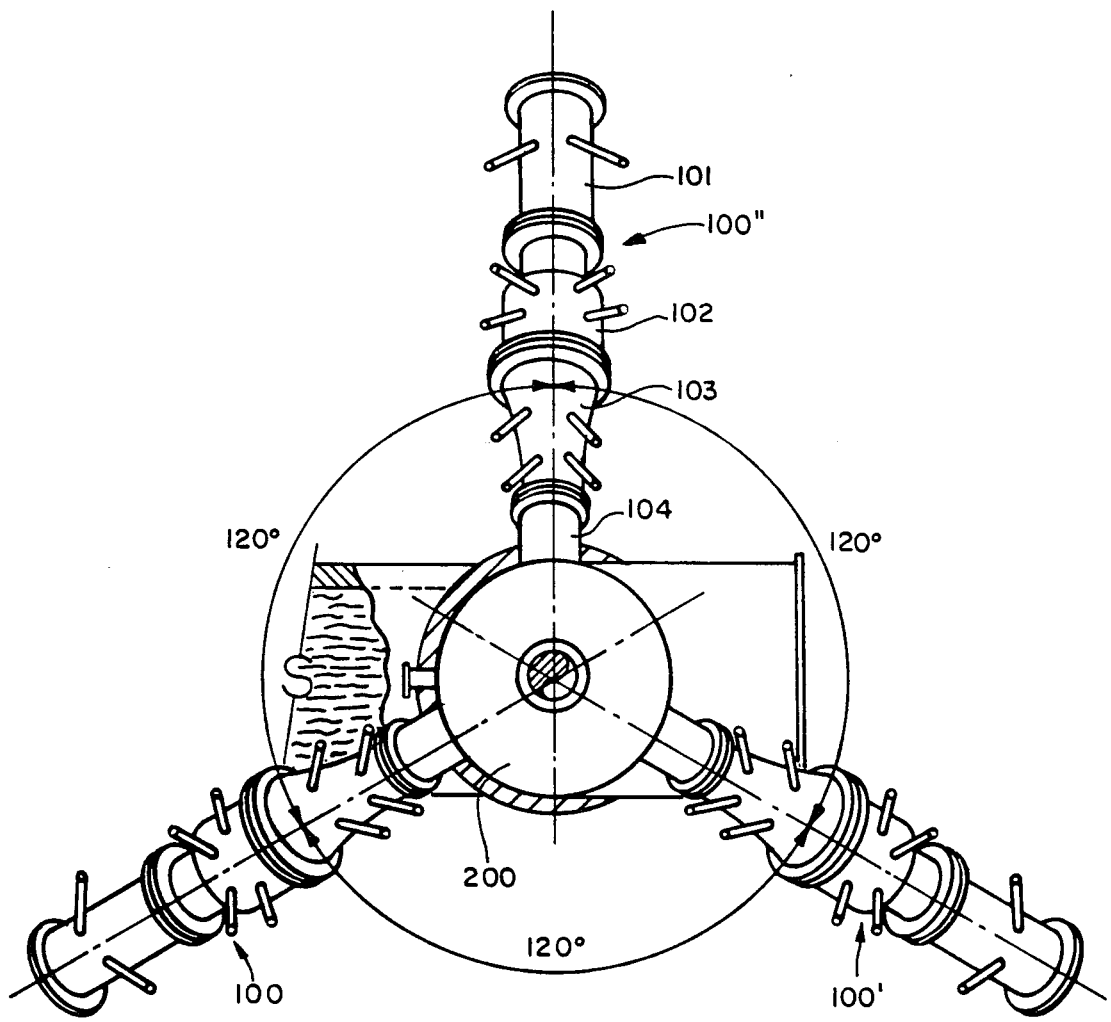
FIG. 2 is a top view of the toroidal vortex melting chamber showing the angular orientation of the batch preheater/injector assemblies.

The primary physical elements of the toroidal vortex melter are embodied in the cross sectional and plan view diagrams given in FIGS. 1 and 2, respectively. The major components of the toroidal vortex melting system include: three batch preheater/injector assemblies 100, 100', 100'', a toroidal vortex reactor 200 with a melting chamber 250, a homogenization and refining section 300, a flue gas distribution duct 400, a final refining reservoir 500, and a molten glass distributor duct 600. Each of the batch preheater/injectors consists of a first glass (Class I) batch ingredient preheater 101, a high intensity gas/oil burner 102, a second glass (Class II and Class III) batch ingredient preheater 103, and a gas-solids suspension injector nozzle 104.

Figure 3:
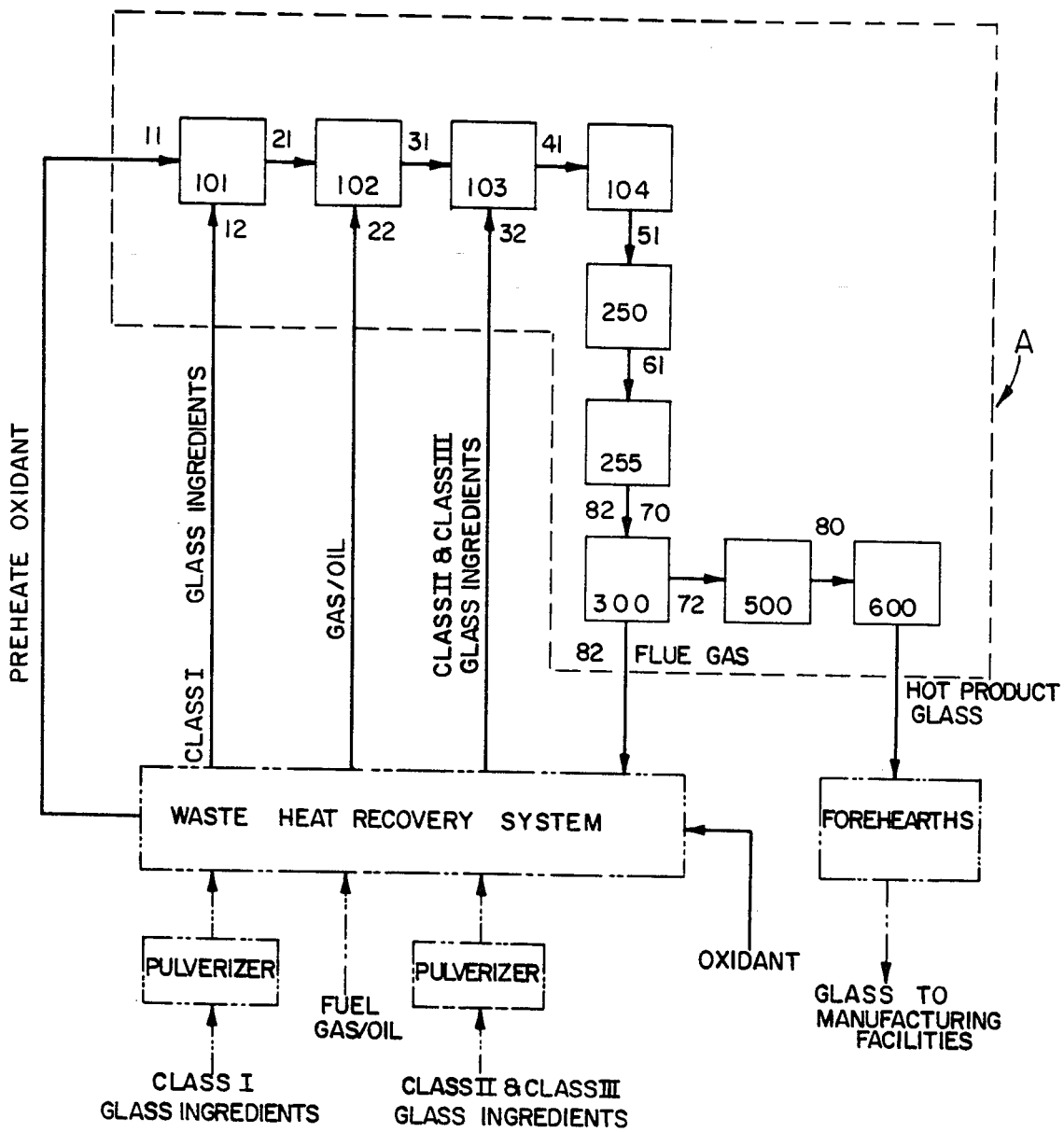
FIG. 3 is a block diagram showing the basic functional elements of the vortex glass melting process.
Figure 4:
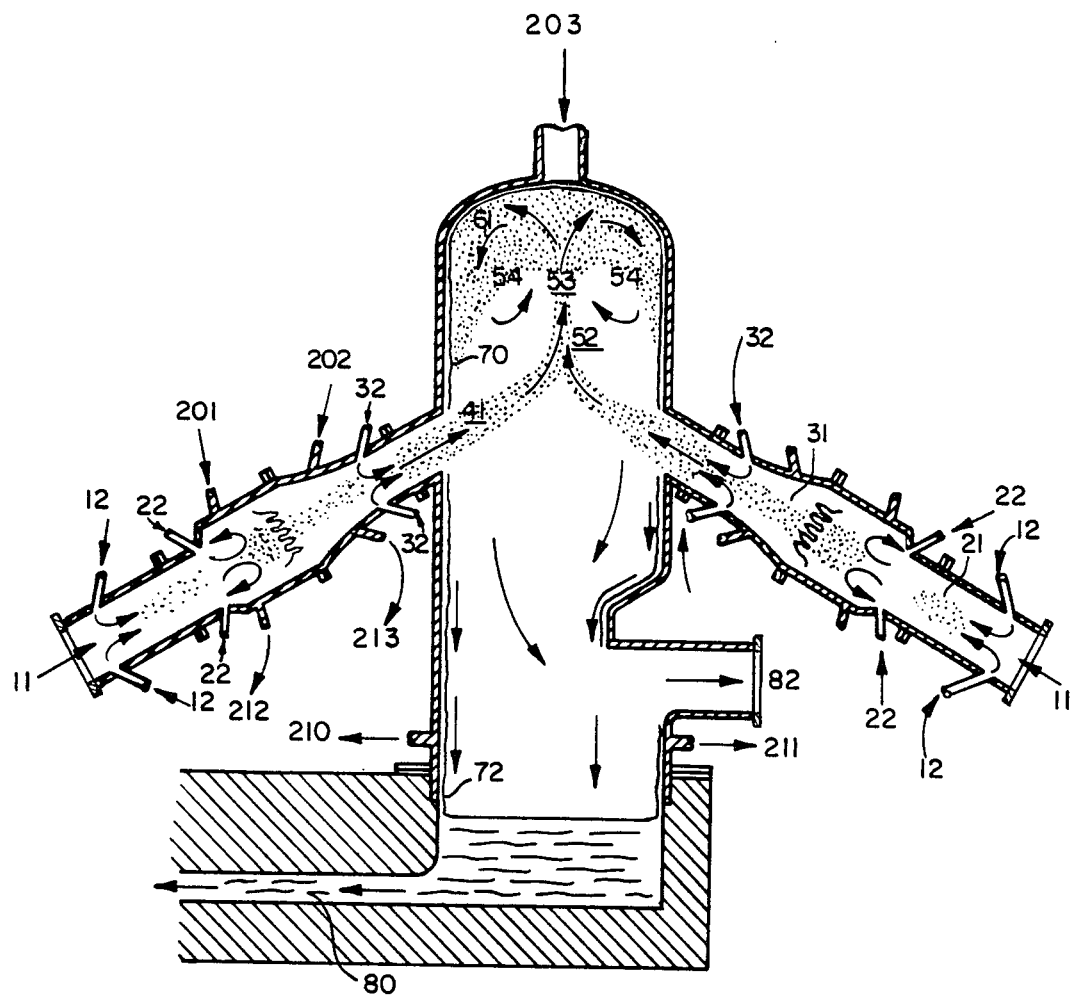
FIG. 4 is a cross sectional view of the invention showing the flow fields in the toroidal vortex chamber and homogenization/refining section; and, FIG. 5 is a diagrammatic representation of a sidewall of the water cooled reactor showing the motion of the glass layer under the influence of gas dynamic shear forces and gravity.

The basic functional elements of the toroidal vortex melting system are shown in FIGS. 3 and 4. FIG. 3 identifies the individual process steps associated with the toroidal vortex melting system; the reaction zones and flow patterns associated with the toroidal vortex melting process are depicted in FIG. 4.

The interface boundary A shown in FIG. 3 separates the major process interfaces. Various different means and methods important to the overall optimum efficiency of the system can be provided for: recovering waste heat from the flue gas 82 and preheating the oxidant 11, preheating the first glass batch materials or ingredients 12, reforming and/or preheating the oil/gas fuel 22, and preheating the second glass ingredients 32; providing cooling water 201, 202, 203 to the toroidal vortex melter and the preheater/injector assemblies; distributing the hot product glass 80 from the reactor or other glass process facilities to forehearths; and delivering the heated cooling water 210, 211, 212, 213 to a heat recovery system or process facilities.

As shown in FIGS. 1 and 4, the first (Class I) pulverized batch materials 12 are preheated in the suspension preheater 101 via mixing of the pulverized batch 12 with preheated oxidant 11. The mixing may take place under atmospheric or high pressure conditions.

The oxidant 11 delivered to the preheater 101 can be air, oxygen enriched air or high purity oxygen. Typical oxidant temperatures are in the range of 1000° F. to 2300° F. The resultant temperature of the gas-solids suspension 21 exiting the preheater 101 will generally be in the range from 600° F. to 1500° F., depending on the oxidant used, the level of initial preheat and the solids loading. The gas to solids loading is on the order to 1:1 on a weight basis, and particle size distributions of the Class I materials are in the range of 50% minus 60 mesh to 90% minus 400 mesh.

The preheated batch suspension 21 passes from the preheater 101 into the high intensity combustor 102. Combustion fuel 22, for example gas or oil, is burned in a high intensity combustor 102 in the presence of the batch suspension 21 to provide the heat of reaction for the vortex glass melting process. Typical stoichiometrics for the gas/oil burner are in the range of 90% (fuel rich) to 110% (air rich). Operation under substoichiometric conditions (90%) coupled with the rapid temperature of the suspension quenching due to the heat transfer to the solids in suspension tends to limit NOx formation in the burner. The heat released in the burner is transferred to the solids suspension and the gas temperature 31 exiting the high intensity combustor 102 is typically in the range of 2500° F.–4000° F., depending primarily on preheat conditions, level of oxygen enrichment, fuel type and solids loading.

The second (Class II and Class III) glass forming ingredients or materials 32 are introduced downstream of the high intensity combustor 102 into a suspension heater 103 where preheating of these ingredients occurs as a result of the mixing with the heated gas-solids suspension 31. Certain Class II ingredients, such as limestone and dolomite, can affect flame stability because of $CO_2$ production and are introduced later in the flow train in order to avoid flame suppression in the high intensity combustor 102. Class III glass ingredients are also introduced later in the flow train (i.e. downstream of the high intensity combustor) to provide a temperature decrement relative to the Class I batch materials. The delayed preheating of the Class III glass ingredients minimizes alkaki oxide vaporization prior to the primary glass forming reactions which occur in the toroidal reactor chamber 200. Typical particle size distributions for the Class II and Class III glass ingredients range from 50% minus 60 mesh to 90% minus 400 mesh. The preheating of the Class II and Class III batch materials lowers the gas temperature of the resultant gas-solids mixture 41 exiting the preheater 103 to nominally 2500° F.–3500° F.

The dispersed and preheated glass making ingredients 41 are introduced into the toroidal vortex chamber 200 through a nozzle injector 104 attached to the toroidal vortex chamber wall. There are preferably three nozzle injectors, one for each preheater assembly, surrounding the toroidal reactor chamber. The exit area of each nozzle defines the velocity of the jet of the preheated ingredients 41 entering the toroidal vortex chamber. Typical injection velocities range from 50 m/sec to 350 m/sec. The injectors are oriented to provide an inclination of 35°–55° with the horizontal and are directed towards a common focal point 52 along the center line of the chamber and approximately one diameter below the chamber dome. An inclination angle of 45° for the injectors is a near optimal for vortex separation performance within the toroidal reactor chamber. As shown in FIG. 2, the preheater/injector assemblies 100, 100', 100'' are spaced at 120° around the circumference of the toroidal reactor chamber.

Within the toroidal reactor chamber, heat is transferred to the batch ingredients via wall radiation, convective heat transfer from the combustion products, and particle-particle heat transfer which includes both radiation and impact effects. At the impingement point 52, the gas/glass ingredients jets impact and are turned vertically upwards to form the central core 53 of a toroidal vortex 54 which encompasses the top portion the toroidal reactor chamber. The toroidal motion of gas and particles within the dome area results in the centrifugal separation and dispersion of the glass ingredient particles toward the toroidal reactor chamber inside walls 255 where the molten and/or hot glass ingredient particles interact to form a molten glass layer 70 via reactions with the other batch ingredients.

During the suspension heatup of the batch materials, the partial liberation of $CO_2$ and $H_2O$ reduces the refining requirements of the glass formed along the toroidal reactor chamber walls.

The primary glass formations occur along the walls of the melting section 250 of the reactor chamber in a thin melt layer 70. The melt layer is formed by the distribution and coalescense of the hot and/or molten particulates along the wall zone of the toroidal reactor chamber. Separation from the gas flow occurs by fluid mechanically induced centrifugal forces from the toroidal vortex 54. The distribution of particulates within the toroidal reactor chamber dome region is essentially homogeneous and leads to circumferential uniformity in the melt layer.

Figure 5:
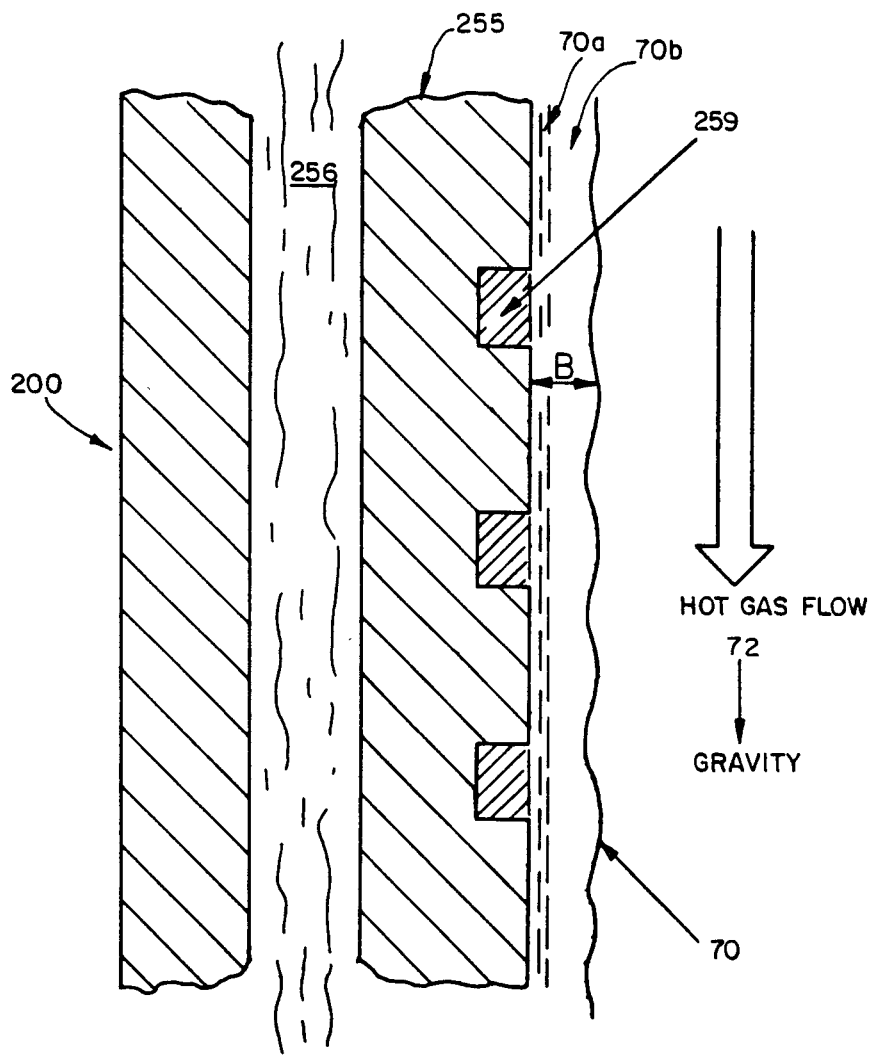

The glass melting reactions occur in the melting section 250 at temperatures typically in the range of 2100° F.–3000° F. The melting reactions in the melt layer are supported by heat transfer to the walls by radiation, convection and particulate heat transfer. FIG. 5 shows the nature of the glass layer along a sidewall 255 section of the toroidal reactor chamber. The metal, preferably water-cooled, reactor walls are designed to be wetted by the molten glass to ensure that bare sports do not form along the chamber walls. The grooved design shown in FIG. 5, which includes refractory wetting strips 259, is known to be an effective wall design. The glass layer formed along the inside wall 255 of the toroidal reactor chamber is typically on the order of 1 cm thick or less as shown at B in FIG. 5. The inside walls 255 of the toroidal reactor chamber are preferably constructed of mild steel or alloy steel. The glass 70a next to the water cooled wall 255 is solidified and provides thermal insulation as well as corrosion protection. The glass 70b on the gas side, however, is inviscid and flows freely down the side of the chamber under the influence of gravity and gas dynamic forces.

Refining basically pertains to the elimination of $CO_2$ and $H_2O$ bubbles which form in the glass melt during the glass forming reactions. The state of oxidation in the glass is an important factor in controlling the rate of refining, with somewhat reducing conditions being preferred. In conventional melting practice, salt cake ($Na_2SO_4$) is often used as a refining agent which involves the liberation of $SO_2$ gas, a flue gas pollutant. In this invention, the state of oxidation in the toroidal reactor chamber can be accurately controlled to be slightly reducing because of the sealed nature of the reactor which prevents air infiltration and other problems, thus enhancing the refining potential for reduced flint glass production.

The liberation of $CO_2$ and $H_2O$ in suspension and the motion of the thin glass layer under gas dynamic and gravity forces will enhance the refining process as well as provide a high degree of chemical and thermal homogeniety. The refining section 300 of the toroidal vortex reactor zoo is essentially a physical extension of the vortex melting section 250. The length of refining section 300 impacts the glass residence time as well as temperature and can be used as a means of controlling the refining/homogenization process. The rapid refining process provides a means of minimizing the size of the refining section and/or the use of the salt cake for reduced flint glass production.

After passing down the length of the refining section 300, the rapidly refined glass 72 passes into a reservoir 500 located at the bottom of the toroidal reactor chamber 200 where final refining and homogenization occurs. The size of the reservoir 500 can be adjusted to provide variations in residence time for the final refining process. A stirrer (not shown) can be utilized in the reservoir if additional homogenization is required. Typical glass temperatures in the reservoir are in the range of 2000° F.–2700° F.

Hot glass 80 exits the final refining/homogenization reservoir through a throat 501 and enters a glass distribution duct 600 for delivery to forehearths (not shown) for final manufacturing. Flue gas 82 exits the toroidal reactor chamber through a preferably water-cooled exhaust duct 400 located above the final refining/homogenization reservoir 500. Typical flue gas temperatures are in the range of 2300° F.–3000° F., depending to a large extent on melt temperature of the glass being produced. A means may be provided for delivering the flue gas to a waste heat recovery system (not shown).

Further embodiments of this invention also recognize that the Class II materials can be introduced along with the Class I glass batch materials if these materials have low flame suppression characteristics.

Another embodiment of this process invention recognizes that it may be possible to inject all classes of batch ingredients into the suspension preheater if flame supression does not occur and the time-temperature histories of the batch ingredients are such that plugging of the injector nozzle does not occur and excessive losses of alkali oxides do not occur. One way of achieving this time temperature history control is by adjusting particle size distribution of the individual glass making ingredient.

In addition, it is possible when using the toroidal vortex reactor to produce glass from a single class batch ingredient. For instance, when cullet alone is utilized as the Class I material it can be entrained, preheated and injected into the toroidal vortex reactor without additional materials to form glass within the reactor.

The present invention may be further embodied in other specific forms without departing from the essential attributes thereof, and accordingly, reference should be made to the appended claims rather than to the foregoing specification as indicating the scope of the invention.

What is claimed is:

1. A method of melting glass in a toroidal vortex reactor comprising the steps of:
    entraining first pulverized glass batch material in an oxidant flow, whereby a first gas-solids suspension is created;
    combusting a fuel in the presence of said first gas-solids suspension, whereby said first gas-solids suspension is heated;
    mixing second glass forming material with said heated first gas-solids suspension, whereby a second gas-solids suspension is created; and,
    injecting said second gas-solids suspension into said toroidal vortex reactor from a plurality of locations about the circumference of said reactor toward a common location within said reactor, whereby the heated second gas-solids suspension particles collide with each other and the wall of said reactor and a glass layer is formed on said reactor walls.

2. A method as claimed in claim 1, wherein said oxidant is heated before entraining said first pulverized glass batch material.

3. A method as claimed in claim 1, wherein said fuel is gas.

4. A method as claimed in claim 1, wherein said fuel is oil.

5. A method as claimed in claim 1, wherein said first glass batch material is comprised of glass making materials which do not decompose readily upon heating and the oxides of the materials have relatively low vapor pressures at glass making temperatures.

6. A method as claimed in claim 1, wherein said first pulverized glass batch material is comprised of sand, cullet, syenite and mixtures thereof.

7. A method as claimed in claim 1, wherein said first gas-solids suspension is heated to a temperature of 600°–1500° F. before said fuel is combusted in the presence thereof.

8. A method as claimed in claim 1, wherein said first gas-solids suspension reaches an equilibrium temperature of 2500°–4000° F. after said fuel is combusted in the presence thereof.

9. A method as claimed in claim 1, wherein said second glass forming material is comprised of at least one glass forming material selected from the group of glass forming materials comprising (a) materials which offgas upon heating and the remaining oxides of which have relatively low vapor pressures at glass melting temperatures and (b) materials which decompose readily upon heating and the remaining oxides of which have relatively high vapor pressures at glass melting temperatures.

10. A method as claimed in claim 1, wherein said second glass forming material is comprised of soda ash ($Na_2CO_3$) and limestone ($CACO_3$) and mixtures thereof.

11. A method as claimed in claim 1, wherein the size distribution of said first pulverized glass batch materials and said second glass forming materials ranges from 50% minus 60 mesh to 90% minus 400 mesh.

12. A method as claimed in claim 1, wherein said second gas-solids suspension is injected from three positions equidistant about the circumference of said reactor.

13. A method as claimed in claim 1, wherein said second gas-solids suspension is injected into said reactor at a velocity of 50–350 meters/second.

14. A method as claimed in claim 1, wherein said second gas-solids suspension is injected into said reactor at an angle of 35°–55° with the horizontal.

15. A method as claimed in claim 1, further comprising water cooling the walls of said toroidal vortex reactor.

16. A method as claimed in claim 1, further comprising controlling the rate of oxidation in said reactor to be slightly reducing.

17. A method as claimed in claim 1, further comprising collecting the melted glass formed within said reactor in a reservoir at the bottom of said reactor.

18. A method as claimed in claim 1, further comprising controlling the refining and homogenization of the glass with the reactor.

19. A method as claimed in claim 18, whereby the refining and homogenization is controlled by controlling the length of the reactor chamber wall.

20. A method of melting glass in a toroidal vortex reactor comprising the steps of:
    providing a gaseous fluid flow;
    entraining first pulverized glass batch materials in said gaseous flow, whereby a first gas-solids suspension is created;
    heating said first gas-solids suspension to at least 2500 degrees F.
    mixing second glass forming materials with said heated first gas-solids suspension, whereby a second glass-solids suspension is created; and,
    injecting said second glass-solids suspension into said toroidal vortex reactor from a plurality of locations about the circumference of said reactor toward a common location within said reactor, whereby the heated second gas-suspension particles collide with each other and the wall of said reactor and a glass layer is formed on said reactor walls.

21. A method is claimed in claim 20 wherein said gaseous fluid is an oxidant.

22. A method of melting glass comprising the steps of:
  providing a toroidal vortex reactor;
  entraining first pulverized glass batch material in a gaseous oxidant flow, whereby a first gas-solids suspension is created;
  combusting a fuel in the presence of said first gas-solids suspension, and heating said first gas-solids suspension to at least 2500° F.;
  mixing second glass forming material with said heated first gas-solids suspension, whereby a second glass-solids suspension is created; and,
  injecting said second glass-solids suspension into said toroidal vortex reactor, whereby the heated second-gas-suspension particles collide with each other and the wall of said reactor and a glass layer is formed on said reactor wall.

23. A method of melting glass comprising the steps of:
  entraining first pulverized glass batch material in a gaseous oxidant flow, whereby a first gas-solids suspension is created;
  combusting a fuel in the presence of said first gas-solids suspension, and heating said gas-solids suspension to at least 2500° F.;
  mixing second glass-forming materials with said first gas-solids suspension, before or after said combusting step, thereby creating a second gas-solids suspension; and
  injecting said heated gas-solids suspension into a toroidal vortex reactor, whereby the heated gas suspension particles collide with each other and the wall of said reactor and molten glass is formed on said reactor wall.

* * * * *

UNITED STATES PATENT AND TRADEMARK OFFICE
CERTIFICATE OF CORRECTION

PATENT NO. : 4,553,997

DATED : November 19, 1985

INVENTOR(S) : James G. HNAT

It is certified that error appears in the above-identified patent and that said Letters Patent is hereby corrected as shown below:

Column 4, Line 60 - "couipled" should be -- coupled --

Column 4, Line 61 - delete "of the suspension"

Column 4, Line 65 - after "perature" insert -- of the suspension --

Signed and Sealed this

Seventeenth Day of June 1986

[SEAL]

Attest:

DONALD J. QUIGG

Attesting Officer

Commissioner of Patents and Trademarks